(12) United States Patent
Jeong et al.

(10) Patent No.: US 9,499,359 B2
(45) Date of Patent: Nov. 22, 2016

(54) TELLER CASH RECYCLER

(71) Applicant: Nautilus Hyosung Inc., Seoul (KR)

(72) Inventors: Yun Seok Jeong, Suwon-si (KR); Sang Hyun Lee, Incheon (KR); Chul Won Jang, Seoul (KR); Seok Kim, Seoul (KR); Geon-Hyeok Lim, Anyang-si (KR)

(73) Assignee: Nautilus Hyosung Inc., Seoul (KR)

( * ) Notice: Subject to any disclaimer, the term of this patent is extended or adjusted under 35 U.S.C. 154(b) by 0 days.

(21) Appl. No.: 14/741,428

(22) Filed: Jun. 16, 2015

(65) Prior Publication Data

US 2016/0167912 A1 Jun. 16, 2016

(30) Foreign Application Priority Data

Dec. 12, 2014 (KR) .................. 10-2014-0179736
Dec. 24, 2014 (KR) .................. 10-2014-0188410

(51) Int. Cl.
*B65H 1/00* (2006.01)
*B65H 1/26* (2006.01)
(Continued)

(52) U.S. Cl.
CPC .............. *B65H 1/266* (2013.01); *B65H 5/002* (2013.01); *B65H 29/001* (2013.01); *E05G 1/026* (2013.01); *E05G 1/06* (2013.01); *G06Q 20/208* (2013.01); *G07D 11/0009* (2013.01); *G07D 11/0057* (2013.01); *G07F 19/201* (2013.01); *G07G 1/0036* (2013.01); *G07G 1/0054* (2013.01);
(Continued)

(58) Field of Classification Search
CPC ............ B65H 1/00; B65H 1/02; B65H 1/26; B65H 1/266; B65H 2402/31; B65H 2402/35; B65H 2402/441; B65H 2405/20; B65H 2405/35; B65H 2405/354; B65H 2701/1912; E05G 1/026; E05G 1/06; G07F 19/00; G07D 9/00; G07D 11/00
See application file for complete search history.

(56) References Cited

U.S. PATENT DOCUMENTS 4,807,736 A    2/1989   Kondo et al.
5,068,758 A * 11/1991   Choi ................ G11B 15/67584
                                                                                 360/95

(Continued)

FOREIGN PATENT DOCUMENTS

JP    2001-187645 A    7/2001
JP    2012-108818 A    6/2012

(Continued)

OTHER PUBLICATIONS

Office Action for Korean Patent Application No. KR 10-2014-0179736, Jan. 19, 2016, 5 Pages.

(Continued)

*Primary Examiner* — Prasad Gokhale
(74) *Attorney, Agent, or Firm* — Fenwick & West LLP

(57) ABSTRACT

According to an embodiment, a teller cash recycler may comprise: a handling unit including a deposit section in which banknotes are deposited and a withdrawal section in which banknotes are withdrawn; a safe having at least one storage unit in the inside thereof where banknotes are stored; a door for selectively opening and closing the safe; a first transfer unit for transferring banknotes between the handling unit and the storage unit; a cassette mounting unit provided in the outer of the door; and a second transfer unit for transferring banknotes between a cassette mounted on the cassette mounting unit and the handling unit, or the cassette mounted on the cassette mounting unit and the first transfer unit.

20 Claims, 10 Drawing Sheets

(51) Int. Cl.
| | |
|---|---|
| *G07F 19/00* | (2006.01) |
| *G07G 1/00* | (2006.01) |
| *G06Q 20/20* | (2012.01) |
| *G07D 11/00* | (2006.01) |
| *B65H 5/00* | (2006.01) |
| *B65H 29/00* | (2006.01) |
| *E05G 1/026* | (2006.01) |
| *E05G 1/06* | (2006.01) |

(52) U.S. Cl.
CPC ....... *B65H 2402/31* (2013.01); *B65H 2402/35* (2013.01); *B65H 2402/441* (2013.01); *B65H 2405/35* (2013.01); *B65H 2405/354* (2013.01); *B65H 2701/1912* (2013.01)

(56) References Cited

U.S. PATENT DOCUMENTS

| | | | |
|---|---|---|---|
| 5,944,163 A | 8/1999 | Keith, III et al. | |
| 8,905,219 B2* | 12/2014 | Iwasaki | G07D 11/0081 194/206 |
| 2005/0189266 A1* | 9/2005 | Fujita | G07F 19/205 209/534 |
| 2006/0081441 A1 | 4/2006 | Vysma et al. | |
| 2007/0181667 A1* | 8/2007 | Kwak | B65H 29/46 235/379 |
| 2011/0210502 A1* | 9/2011 | Fujita | B65H 5/062 271/258.01 |
| 2015/0102549 A1* | 4/2015 | Taoka | B65H 1/14 271/3.08 |
| 2015/0307306 A1* | 10/2015 | Kadota | G07D 11/00 271/3.19 |
| 2015/0314977 A1* | 11/2015 | Takada | B65H 31/00 271/306 |

FOREIGN PATENT DOCUMENTS

| | | |
|---|---|---|
| KR | 10-2009-0093698 | 9/2009 |
| WO | WO 2010/108536 A1 | 9/2010 |

OTHER PUBLICATIONS

Extended European Search Report for European Patent Application No. EP 15172345.9, Apr. 28, 2016, 9 Pages.

* cited by examiner

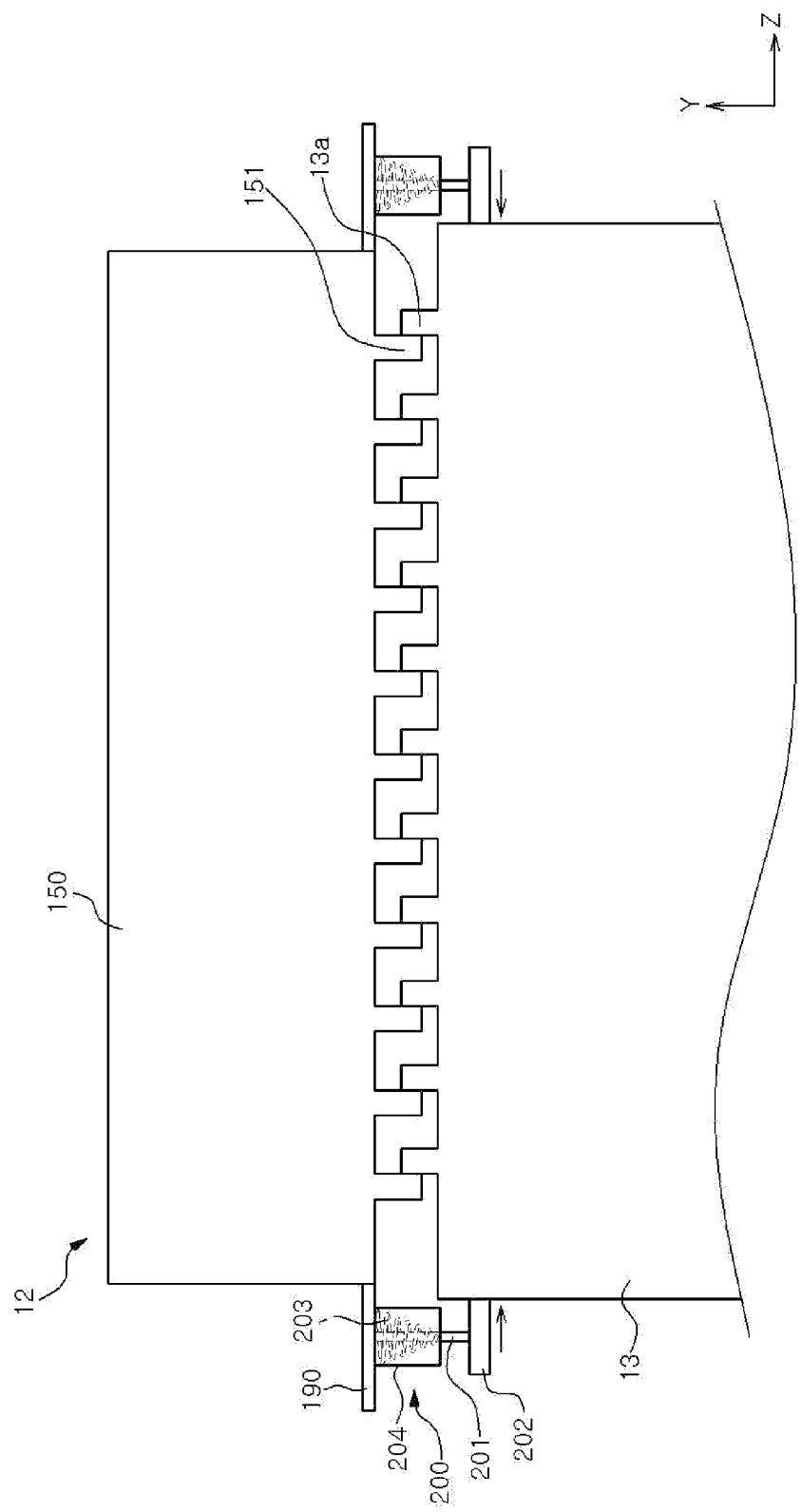

TELLER CASH RECYCLER

CROSS-REFERENCE TO RELATED APPLICATIONS

This application claims priority to Korean Patent Application No. 10-2014-0179736 filed on Dec. 12, 2014 and Korean Patent Application No. 10-2014-0188410 filed on Dec. 24, 2014, which are incorporated by reference herein in their entirety.

FIELD OF THE INVENTION

The present invention relates to a teller cash recycler.

BACKGROUND OF THE INVENTION

An automated teller machine (ATM) is a system that may provide financial services such as deposit or withdrawal without the aid of a bank official regardless of time and place.

In recent years, it is a trend to introduce an ATM for customers using financial institutions as well as a cash recycler for tellers in order to improve the efficiency of the internal operations of the relevant financial institution and expedite the settlement operations after the close of business.

For example, a teller cash recycler may be placed under the desk of the teller, may be equipped with a storage unit therein for storing banknotes, may be made for deposit or withdrawal by the operation of the teller, and may count the banknotes in real time.

Typically, a teller cash recycler may include a handling unit for deposit and withdrawal of banknotes by an operation of the teller, a safe with a storage unit for storing the banknotes, a transfer unit for transferring the banknotes, and a door for selectively opening and closing the safe and the like.

However, in the case of a conventional teller cash recycler, it is inconvenient to open the safe by operating the door every time when the banknotes stored in the storage unit are taken out to the outside, or when the storage unit is replenished with the banknotes from the outside. In particular, since opening the safe requires a separate approval of a bank official, it is necessary to obtain a procedure of approval of bank officials every time of recalling or replenishing the banknotes, which makes an operational convenience and an accessibility to be reduced.

SUMMARY OF THE INVENTION

In view of the above, the embodiments of the present invention provide a teller cash recycler that a cassette mounting unit in which a cassette being capable of connecting to the inside of the teller cash recycler is mounted thereon is provided in the outside of the door thereof.

In accordance with an aspect of the present invention, there is provided a teller cash recycler comprising: a handling unit including a deposit section in which banknotes are deposited and a withdrawal section in which banknotes are withdrawn; a safe having at least one storage unit in the inside thereof where banknotes are stored; a door for selectively opening and closing the safe; a first transfer unit for transferring banknotes between the handling unit and the storage unit; a cassette mounting unit provided in the outer of the door; and a second transfer unit for transferring banknotes between a cassette mounted on the cassette mounting unit and the handling unit, or the cassette mounted on the cassette mounting unit and the first transfer unit.

Further, when the cassette is mounted, the cassette mounting unit is inclined so as for the upper portion thereof to be away from the door than the lower portion thereof, and the cassette is inserted into the cassette mounting unit at an angle.

Further, after the cassette is mounted on the cassette mounting unit, when an external force is applied toward the door for the cassette or the cassette mounting unit, the cassette and the cassette mounting unit are released from inclining and the cassette is connected to the second transfer unit.

Further, the handling unit is provided on the upper portion of the teller cash recycler so as to be capable of sliding forward, and when the cassette is inserted into the cassette mounting unit in the inclined state, the upper end of the cassette is positioned below the lower end of the handling unit so as not to interfere the handling unit with sliding forward.

Further, the cassette mounting unit comprises: a first support member for supporting a part of the door side of the cassette; a second support member for supporting the opposite part of door side of the cassette; and a link member which is connected rotatably to the first support member and the second support member respectively and controls an angle between the first support member and the second support member by the rotation, and the cassette is inserted between the first support member and the second support member.

Further, the cassette mounting unit further comprises: a bracket being connected to the door and having a first elongated hole formed in the upper portion thereof; and a guide shaft being connected to the first support member and being moved along the first elongated hole at both ends thereof, and the first support member is rotatable on the lower portion thereof by the movement of the guide shaft.

Further, the cassette mounting unit further includes a bracket being connected to the door and having a first elongated hole formed in the upper portion thereof, and the lower portion of the second support member is connected rotatably to the lower portion of the bracket so as for the second support member to be capable of rotating on the lower portion of the bracket.

Further, on one side of the link member, a second elongated hole extending from one end to the central portion of the link member is formed, and the other side of the link member is connected rotatably to the second support member, and the cassette mounting unit further includes a coupling member which is inserted into the second elongated hole while still connected to the first support member and is moved along the second elongated hole, and based on the case where the cassette mounting unit is inclined so as for the cassette to be mounted thereon, the first support member and the second support member are inclined so as for the respective upper portion to be away from the door than the respective lower portion, and by the movement of the coupling member toward the direction away from the central portion of the link member along the second elongated hole, the link member is rotated so as for the angle between the first support member and the second support member to be increased.

Further, the cassette mounting unit further includes a support shaft which supports the lower portion of the cassette.

Further, the first elongated hole includes a part of downward curvature in a direction away from the door side.

Further, the cassette mounting unit further includes: a bracket connected to the door; a hook provided in the bracket; and a pin member provided in the second support member, wherein when the cassette is not mounted, as the second support member approaches to the door side, the pin member being fastened to the hook.

Further, the cassette mounting unit further includes a shaft of which both ends are connected to the bracket respectively, wherein the hook includes a sloped region, which is located at the end opposite of the door and becomes away from the door toward the upper direction, and a coupling slot which is formed in a concavity from the bottom to the top, the hook being penetrated by the shaft at the end of the door side so as to be rotatable, and wherein the pin member is inserted into the coupling slot, after the hook is rotated upwardly, as the pin member approaches to the door side while still being contact with the sloped region.

Further, a handler which can be gripped by a user for rotating upwardly the hook is provided on one side of the hook.

Further, the teller cash recycler further comprises a fixing unit for fixing a position of the cassette when the cassette is connected to the second transfer unit.

Further, the fixing unit includes: a fixing pin being capable of inserting into a fixing slot which is formed by extending in the vertical direction in a concavity of the lower end of the cassette; a holder being moved integrally with the fixing pin; a first elastic member providing a downward elastic force to the holder; and a switch member allowing selectively the holder and the fixing pin to be lowered.

Further, the fixing unit further include a rotary bar which is rotatable by the contact of the lower portion thereof with the cassette, wherein the switch member has a concavity formed in the central portion thereof, and wherein when the rotary bar is rotated, the upper portion of the rotary bar moves the switch member to the opposite side of the door, the lever and the fixing pin are lowered on the concavity by the downward elastic force, and the fixing pin is inserted into the fixing slot of the cassette.

Further, the width of the holder is formed larger than the width of the switch member so as for at least one end of the holder is not supported upwardly by the switch member.

Further, the fixing unit further includes a second elastic member which provides an elastic force to the switch member in the direction toward the door, and wherein when the holder and the fixing pin are raised, the switch member is returned to the original position by the elastic force exerted in the direction toward the door.

Further, the rotary bar is provided with a roller being in direct contact to the cassette in the lower portion thereof.

Further, the teller cash recycler further comprises a home position module which derives the home position of the cassette when the cassette is connected to the second transfer unit.

In accordance with an aspect of the present invention, there is provided a teller cash recycler comprising: a handling unit including a deposit section in which banknotes are deposited and a withdrawal section in which banknotes are withdrawn; a safe having at least one storage unit in the inside thereof where banknotes are stored; a door for selectively opening and closing the safe; at least one transfer unit for transferring banknotes; a cassette mounting unit provided in the outer of the door; and a cassette being selectively mounted on the cassette mounting unit, wherein when the cassette is mounted, at least a portion of the cassette mounting unit moves in a direction away from the door such that a space is formed between the at least a portion of the cassette mounting unit and the door, and the cassette is inserted into the space.

According to the embodiments of the present invention, there is provided a teller cash recycler that a cassette mounting unit of which cassette being capable of connecting to the inside of the teller cash recycler is mounted thereon is provided in the outside of the door thereof.

BRIEF DESCRIPTION OF THE DRAWINGS

The above and other objects and features of the present invention will become apparent from the following description of the embodiments given in conjunction with the accompanying drawings, in which:

FIG. 11 is a view illustrating a state as viewed from the front of a cassette when the cassette is mounted.

DETAILED DESCRIPTION OF THE EMBODIMENTS

Figure 1:
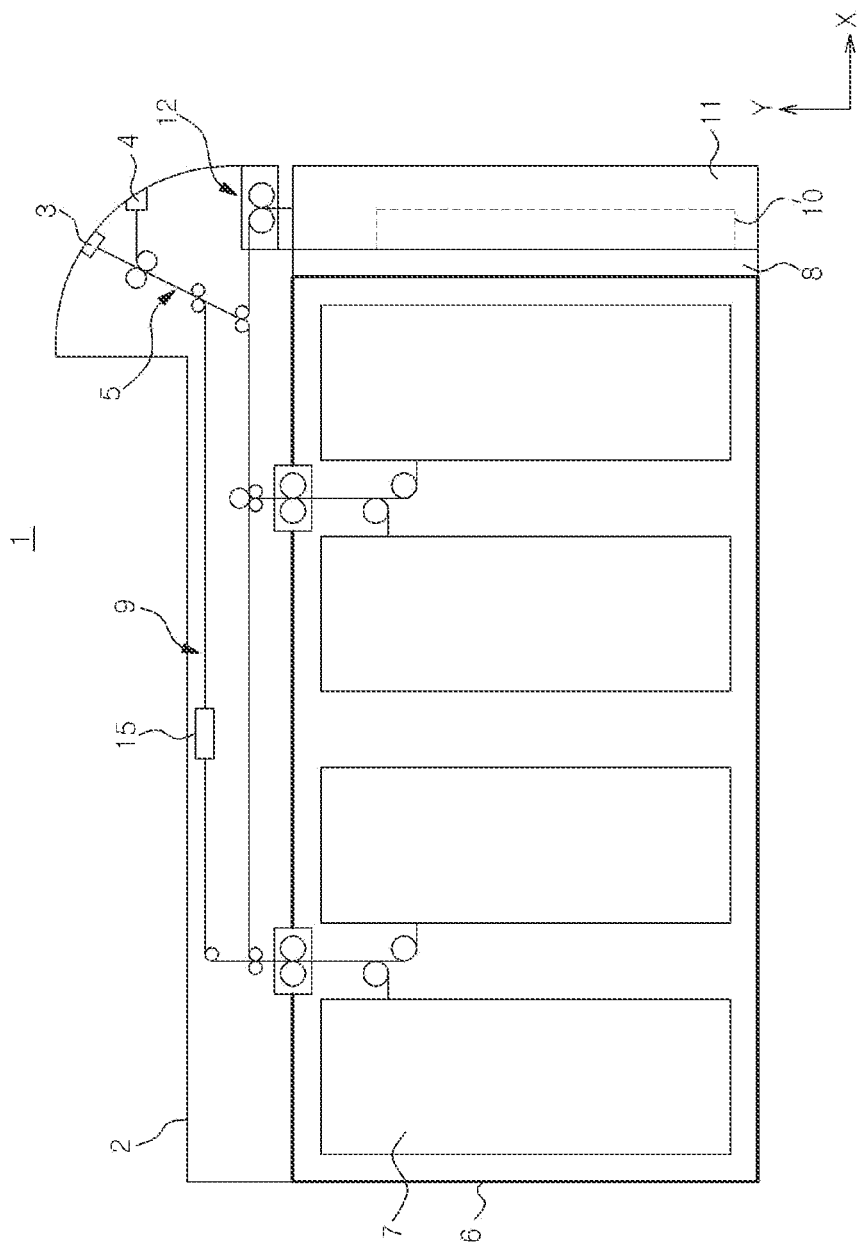
FIG. 1 is a schematic side view of a teller cash recycler according to an embodiment of the present invention.

Hereinafter, specific embodiments for implementing the technical idea of the present invention will be described in detail with reference to the accompanying drawings. In addition, if the detailed description of known functions and configurations are determined to obscure the gist of the present technical idea, the detailed description thereof will be omitted.

For reference, X direction in the drawings may mean a front direction or an outer direction of the door, Y direction may mean a vertical direction, and Z direction may mean a widthwise direction.

FIG. 1 is a schematic side view of a teller cash recycler 1 in accordance with an embodiment of the present invention. As shown in FIG. 1, the teller cash recycler in accordance with the present embodiment may include a handling unit 2, a safe 6, a first transfer unit 9, a second transfer unit 12, a cassette mounting unit (hereinafter, mounting unit) 10 and a cover 11.

The handling unit 2 may be a unit that carries out a deposit, a withdrawal, a count, etc. of banknotes by a user's operation. For example, the banknotes may be deposited into the teller cash recycler 1 through a deposit section 3 and may be withdrawn outside of the teller cash recycler 1 through a withdrawal section 4. In addition, the handling unit 2 is designed for a relative motion with the safe 6 to be allowed (e.g., it may include a guide rail and a roller), and thus may be projected forward by sliding against the safe 6. Further, the handling unit 2 may be provided on the top of the teller cash recycler 1 for easy operation of a user. Furthermore, the handling unit 2 may be provided with a transfer unit 5 for a deposit and a withdrawal. The transfer unit 5 for a deposit and a withdrawal, for example, may make the deposit section 3 and the withdrawal section 4 to be connected to the first transfer unit 9, which will be described later, and also may make the deposit section 3 and the withdrawal section 4 to be connected to the second transfer unit 12, which will be described later.

The safe 6 provides a space for the storage of banknotes and may be protected from external access to the stored banknotes. In the inside of the safe 6, at least one storage unit 7 may be provided, and banknotes may be stored in each of divided storage units 7. In this case, each storage unit 7 may store different types of banknotes respectively. Meanwhile, the storage unit 7 may be a part divided by the plate-shaped member in the inner space of the safe 6, or the storage unit 7 may be provided as a separate cassette enabling deposit and withdrawal of banknotes. In addition, at least one storage unit 7 may be designed so as to be projected at one try by sliding same as the handling unit 2. For example, a cart supporting a plurality of the storage units 7 is provided inside the safe 6, and the cart may take a relative motion with the safe 6 so as to be projected forward together with the storage units 7 from the safe 6.

The first transfer unit 9 may carry out a transfer of banknotes between the handling unit 2 and the storage unit 7. To this end, the first transfer unit 9 may include a plurality of rollers and transferring paths. Typically the first transfer unit 9 may be provided between the handling unit 2 and the storage unit 7, but there is no limitation on the specific position according to the present invention.

In the front of the safe 6, a door 8 may be provided for selectively opening and closing the safe 6. In the outside of the door 8, the mounting unit 10 and the cover 11 may be provided in sequence. The mounting unit 10 may be selectively fastened to the door 8 or cover 11, as being described later. In the state of FIG. 1, the mounting unit 10 and the cover 11 may be fastened. The cover 11 may cover the door 8 and the mounting unit 10 for the sake of aesthetics and security of the teller cash recycler 1. In the state of FIG. 1, the cover 11 may be fastened to the handling unit 2, the safe 6 or the door 8 by means of a fastening tool (not shown).

The second transfer unit 12 may carry out a transfer of banknotes between the cassette mounted on the mounting unit 10 and the handling unit 2. In addition, the second transfer unit 12 may carry out a transfer of banknotes between the cassette mounted on the mounting unit 10 and the first transfer unit 9.

Meanwhile, the cassette to be mounted on the mounting unit 10 may be used for replenishing banknotes. For example, when it is necessary to replenish a specific banknote to the storage unit 7, a user may operate the door 8 to put the specific banknote into the cassette without opening the safe 6, and then may mount the cassette on the mounting unit 10. The specific banknote may be stored in a particular storage unit 7 through the second transfer unit 12 and the first transfer unit 9. Further, the cassette to be mounted on the mounting unit 10 may be used for recalling banknotes. For example, when it is necessary to recall the banknotes stored in the particular storage unit 7, a user may mount the cassette on the mounting unit 10 and then make the banknotes stored in the particular storage unit 7 to be transferred to the cassette. The banknotes stored in the particular storage unit 7 may be stored in the cassette through the first transfer unit 9 and the second transfer unit 12. Thus, a user may withdraw the banknotes by operating the door 8 without opening the safe 6. In addition, the handling unit 2 may include a banknote discrimination unit 15 for discriminating an abnormal banknote. If some of the banknotes are determined as abnormal banknotes when withdrawing, the abnormal banknotes may be transferred to the cassette of the mounting unit 10, without transferring to the deposit section 4. Thereby, a user can easily check and recall an abnormal banknote by operating the door 8 without opening the safe 6 (same as the case of deposit). Further, the cassette mounted on the mounting unit 10 may also function as a temporary storage bin for the banknotes deposited through the deposit section 3. Some of the banknotes stored temporarily in the cassette may be transferred to the storage unit 7, and the remaining banknotes may be returned through the withdrawal section 4.

Hereinafter, a procedure of mounting the cassette which may carry out the above mentioned functions will be described with reference to FIG. 2 through FIG. 4.

Figure 2:
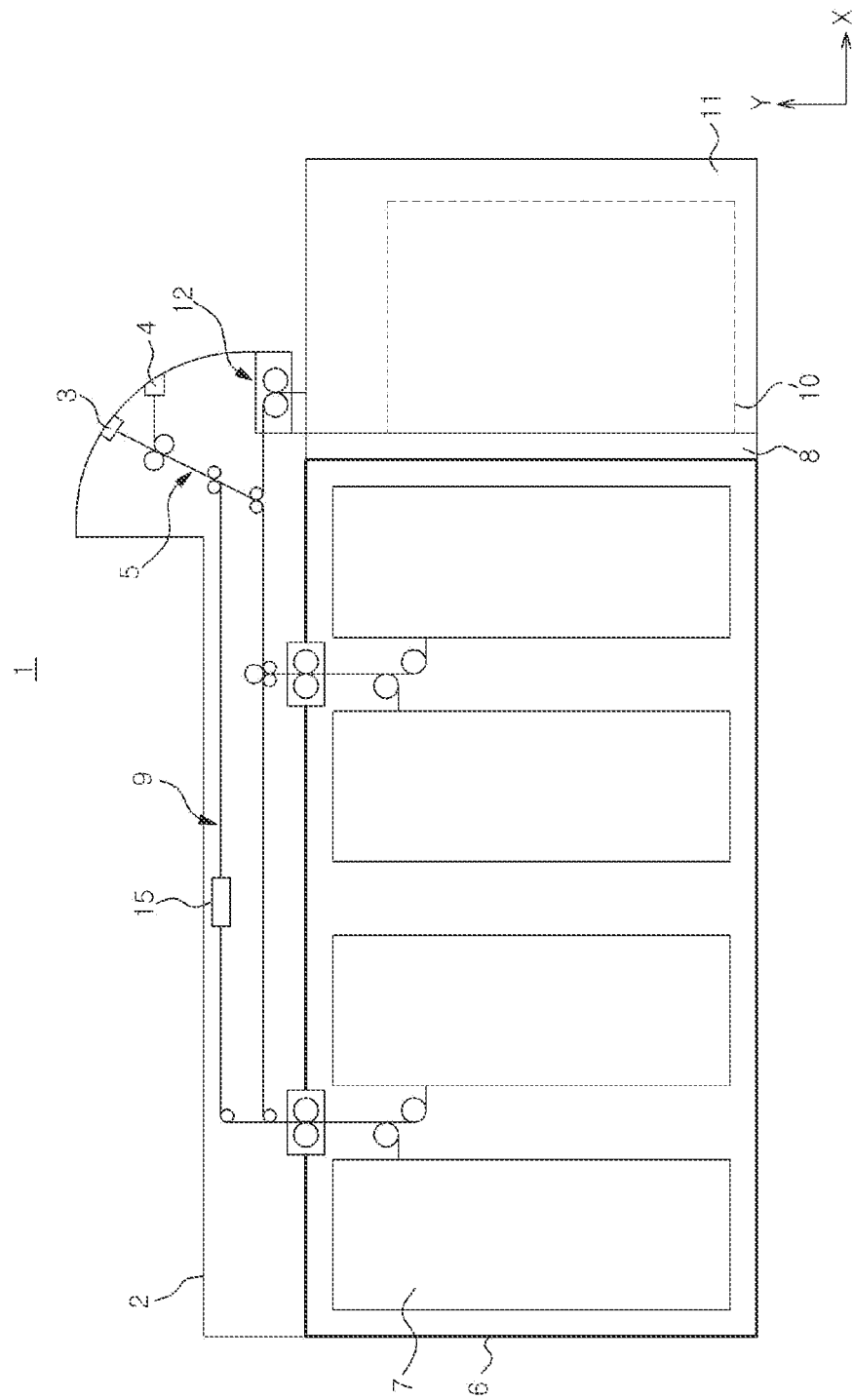
FIG. 2 is a schematic side view illustrating a cover and a cassette mounting unit fastened to the cover in an unfolded form.

FIG. 2 is a schematic side view illustrating the cover 11 and the mounting unit 10 fastened to the cover 11 in an unfolded form. As described above, the mounting unit 10 may be selectively fastened to the door 8 or the cover 11. When the mounting unit 10 is under the state fastened to the cover as shown in FIG. 1, a user may open the cover 11 to mount the cassette. When a user opens the cover 11, the mounting unit 10 fastened to the cover 11 also may be opened.

Figure 3:
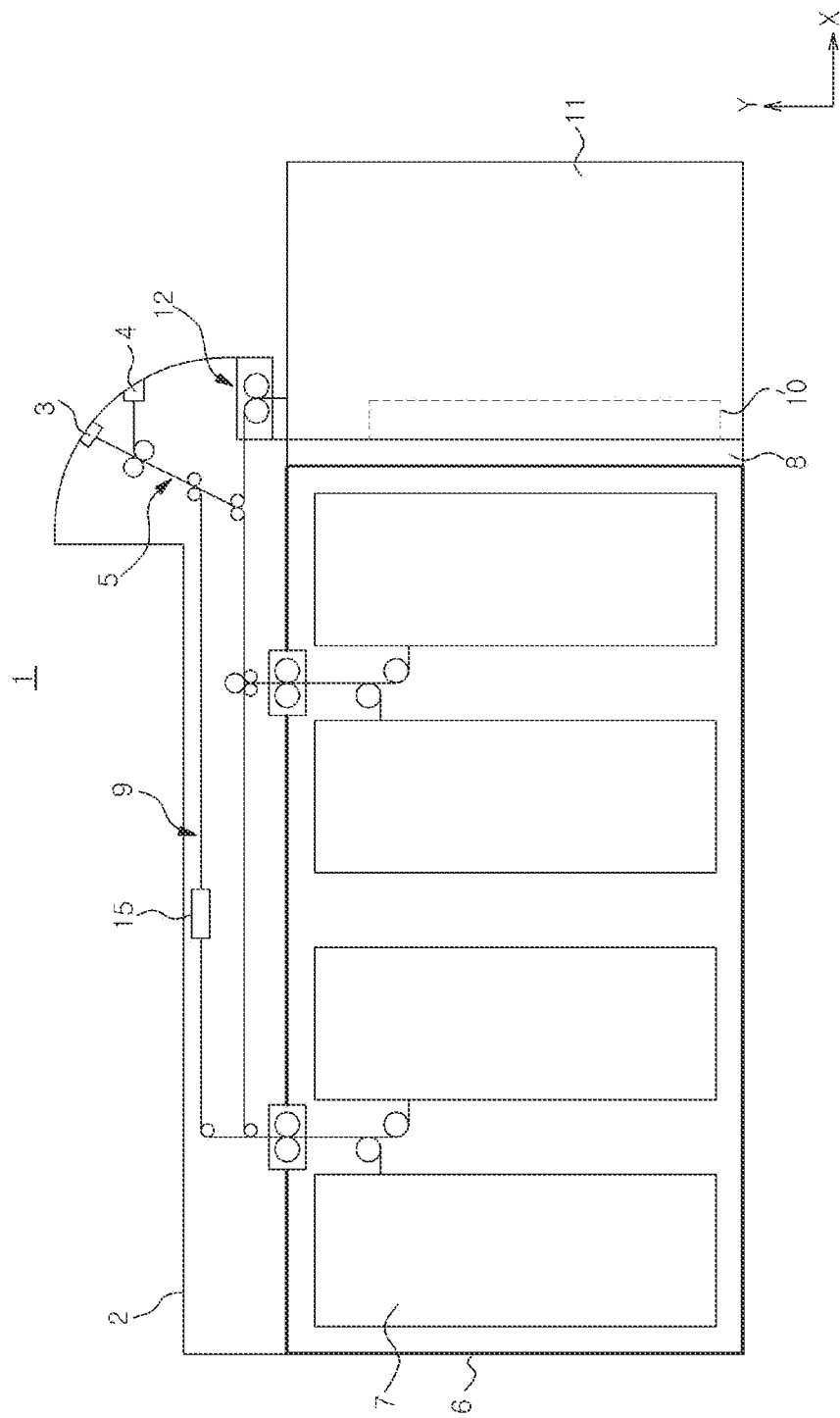
FIG. 3 is a schematic side view illustrating a state that the fastening of a cover and a cassette mounting unit is released, and the cassette mounting unit is fastened to a door.

FIG. 3 is a schematic side view illustrating a state that the fastening of the cover 11 and the mounting unit 10 is released, and the mounting unit 10 is fastened to the door 8. The fastening of the cover 11 and the mounting unit 10 may be released by a user's operation, and the mounting unit 10 may be fastened to the door 8 by a closing motion of the mounting unit 10 toward the door 8.

Figure 4:
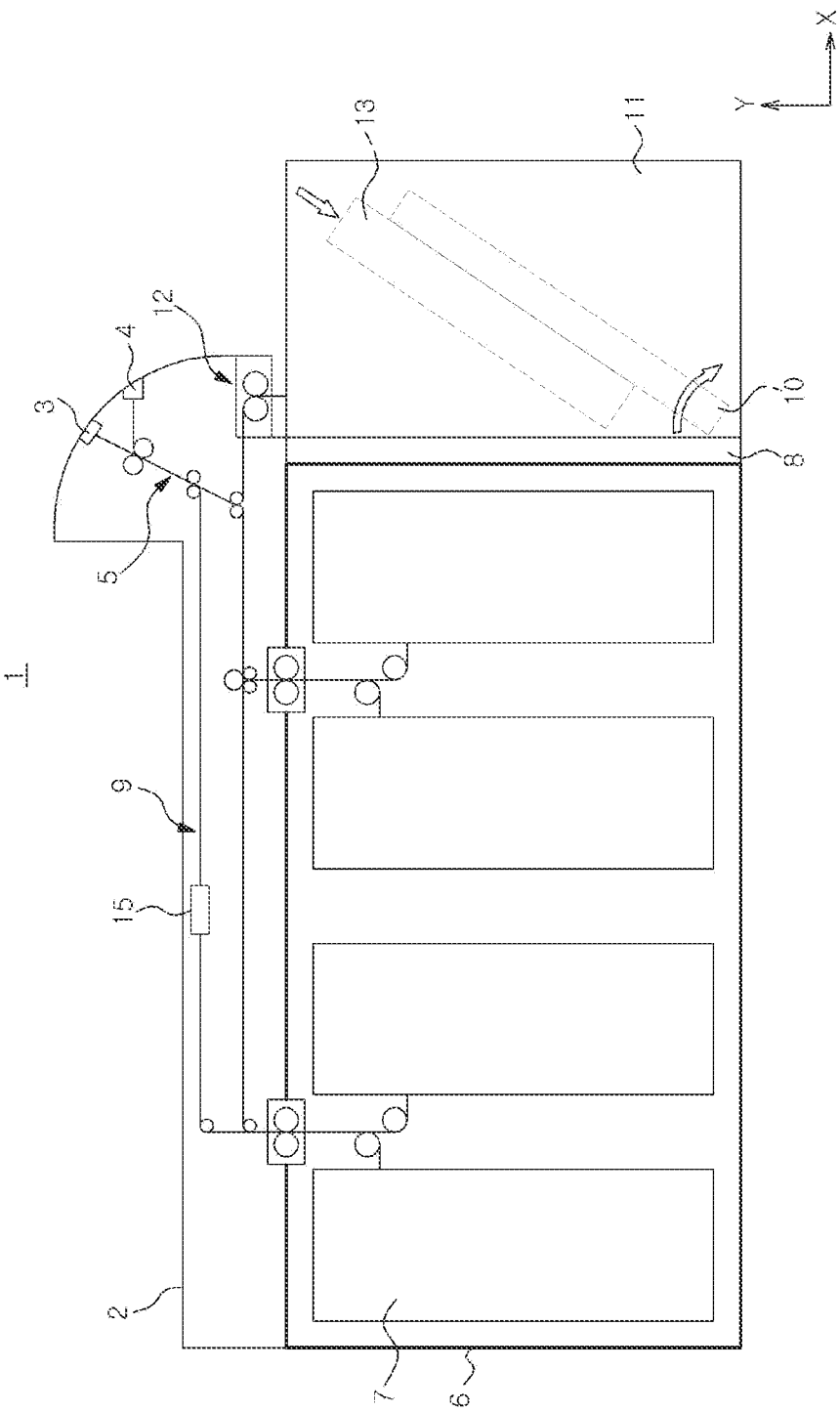
FIG. 4 is a schematic side view illustrating a state that after a cassette mounting unit is inclined, a cassette is inserted at an angle.

FIG. 4 is a schematic side view illustrating a state that after the mounting unit 10 is inclined, the cassette 13 is inserted at an angle. When the mounting unit 10 is fastened to the door 8, the mounting unit 10 may be inclined forward so as for the cassette to be mounted. The cassette 13 may be inserted from the top of the mounting unit 10 to the bottom thereof at an angle. When the cassette 13 is finished to be inserted, a user may push up the cassette 13 or the mounting unit 10 toward the door 8, thereby the upper end of the cassette 13 may be connected to the second transfer unit 12.

When ending use of the cassette 13, the cassette 13 may be removed from the mounting unit 10 and then the mounting unit 10 may release from inclining, thereby returning to the state as shown in FIG. 3. Next, the fastening of the mounting unit 10 and the door 8 may be released, and at the same time the mounting unit 10 may be fastened to the cover 11, thereby returning to the state as shown in FIG. 2. Finally, a user may close the cover 11 toward the door 8, and thereby the teller cash recycler 1 may be returned to the state as shown in FIG. 1.

As described above, the mounting unit 10 on which the cassette 13 is mounted is provided in the outside of the door 8, and thereby it is possible to carry out various operations conveniently and quickly without opening the safe 6. In particular, it is not required to obtain an approval of a bank official in order to open the safe 6, and thereby convenience on operation of the teller cash recycler 1 and accessibility of users can be remarkably increased.

In addition, because the mounting unit 10 is inclined forward to provide a space required for the cassette 13 to be mounted only when necessary, it is possible to make the teller cash recycler 1 to be slim down overall in normal times when the cassette 13 is not used.

Further, as shown in FIG. 4, the mounting unit 10 is inclined forward, but the upper end of the mounting unit 10 and the cassette mounted on the mounting unit 10 may not interfere for the handling unit 2 of the upper portion of the teller cash recycler 1 to be projected forward by sliding. Therefore, when a jam occurs in the transfer units 9, 12, a user may remove the jam by projecting the handling unit 2 forward without disassembling the whole teller cash recycler 1. This may be similar as the case of the storage unit 7. In case where a plurality of storage units 7 may be projected forward at one try by sliding, when a jam occurs in the transfer units 9, 12, the jam may be removed after the plurality of storage units 7 is projected forward.

Also, the cassette 13 may be mounted temporarily on the mounting unit 10 only when the cassette 13 is necessary to be used. In case of the present embodiment, a user may mount the cassette 13 on the mounting unit 10 while the cover 11 is opened, and, when ending use of the cassette 13 after using the cassette 13, may remove the cassette 13 and close the cover 11. In other words, in case of the teller cash recycler 1 according to the present embodiment, a step of closing the opened cover 11 for using the cassette 13 and a step of opening again the cover 11 for removing the cassette 13 when ending use of the cassette 13 are not required, and thereby the operation may be convenient.

Figure 5:
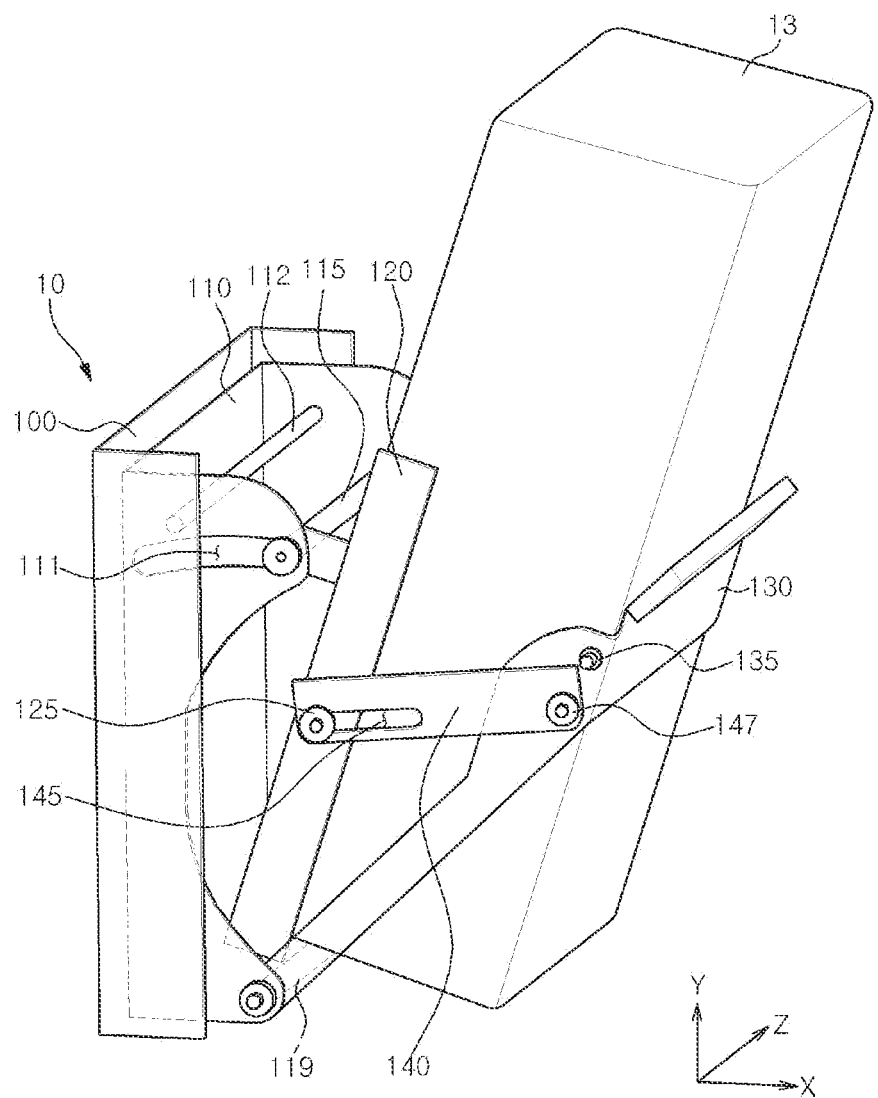
FIG. 5 is a perspective view of a cassette mounting unit of a teller cash recycler according to the embodiment of FIG. 1.

FIG. 5 is a perspective view of the mounting unit 10 of the teller cash recycler 1 according to the present embodiment. As shown, the mounting unit 10 may include brackets 100, 110, a first support member 120, a second support member 130, and a link member 140.

The first bracket 100 may be a part in direct contact to the door 8, and the second bracket 110 may be a part which is provided on the outside of the first bracket 100 and is connected to other components. However, two brackets 100 and 110 are not always required and any one bracket only may be provided depending on the design.

The second bracket 110 has on its upper portion a first elongated hole 111 extending in the X direction as a whole may be formed. The first elongated hole 111 may guide the movement of a guide shaft 115 and the rotation of the first support member 120, which will be described later. The first support member 120 is lowered in the overall vertical position thereof while inclining forward. Therefore, the first elongated hole 111 may include a downwardly inclined part, and the downwardly inclined part may have a curvature which is previously set for a smooth rotation of the first support member 120.

The first support member 120 may support a part of the door 8 of the cassette 13. The first support 120 may be connected to the guide shaft 115, and both ends of the guide shaft 115 may be moved along the above-mentioned first elongated hole 111. As a result, the first support member 120 may be inclined forward while rotating on the center of the bottom of the first support member 120 along the first elongated hole 111. The bottom of the first support member 120 may be penetrated, for example, by a support shaft 119 to be described later. In this case, the first support member 120 may rotate on the support shaft 119.

The second support member 130 may support the opposite portion of the door 8 of the cassette 13. The second support member 130 may be coupled rotatably to the lower portion of the second bracket 110 and may be inclined forward while rotating on the coupled point. For example, as shown, both ends of the second support member 130 may be connected to the support shaft 119 which is penetrated to the lower portion of the second bracket 110, thereby being capable of rotating on the support shaft 119.

The cassette 13 may be inserted between the first support member 120 and the second support member 130. For the insertion of the cassette 13, it is necessary for the angle between the first support member 120 and the second support member 130 to be increased by a link member 140. In addition, when the cassette 1 is removed upon ending use of the cassette 13, it is necessary for the angle between the first support member 120 and the second support member 130 to be reduced. On one side of the link member 140, a second elongated hole 145 extending from the one end of the link member 140 to the central portion thereof may be formed, and the other side of the link member 140 may be coupled rotatably to the second support member 130 at a coupling point 147. When the link member 140 is rotated on the coupling point 147 with respect to the second support member 130, an coupling member 125 inserted into the second elongated hole 145 while being connected to the first support member 120 may be moved toward the central portion of the link member 140 along the second elongated hole 145 (or moved toward one end of the link member 140), and thereby the own angle of the link member 140 may vary, and also the angle between the first support member 120 and the second support member 130 may vary.

Meanwhile, when the cassette 13 is inserted, the cassette 13 may be supported upwardly by the support shaft 119.

Figure 6:
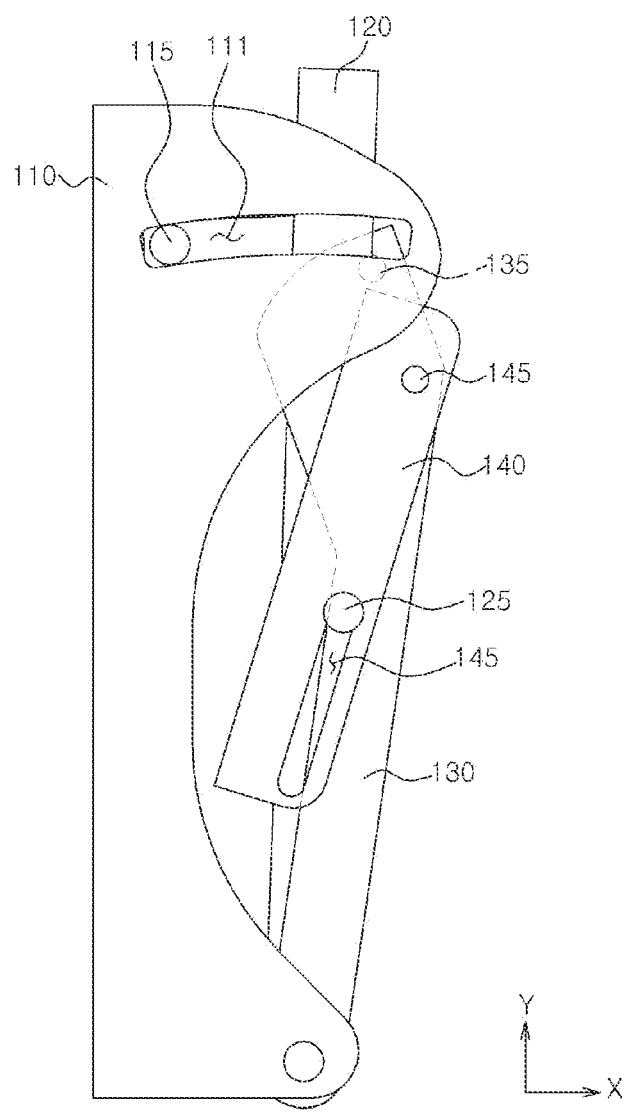
FIG. 6 is a side view illustrating a cassette mounting unit in which a cassette is not mounted thereon.
Figure 7:
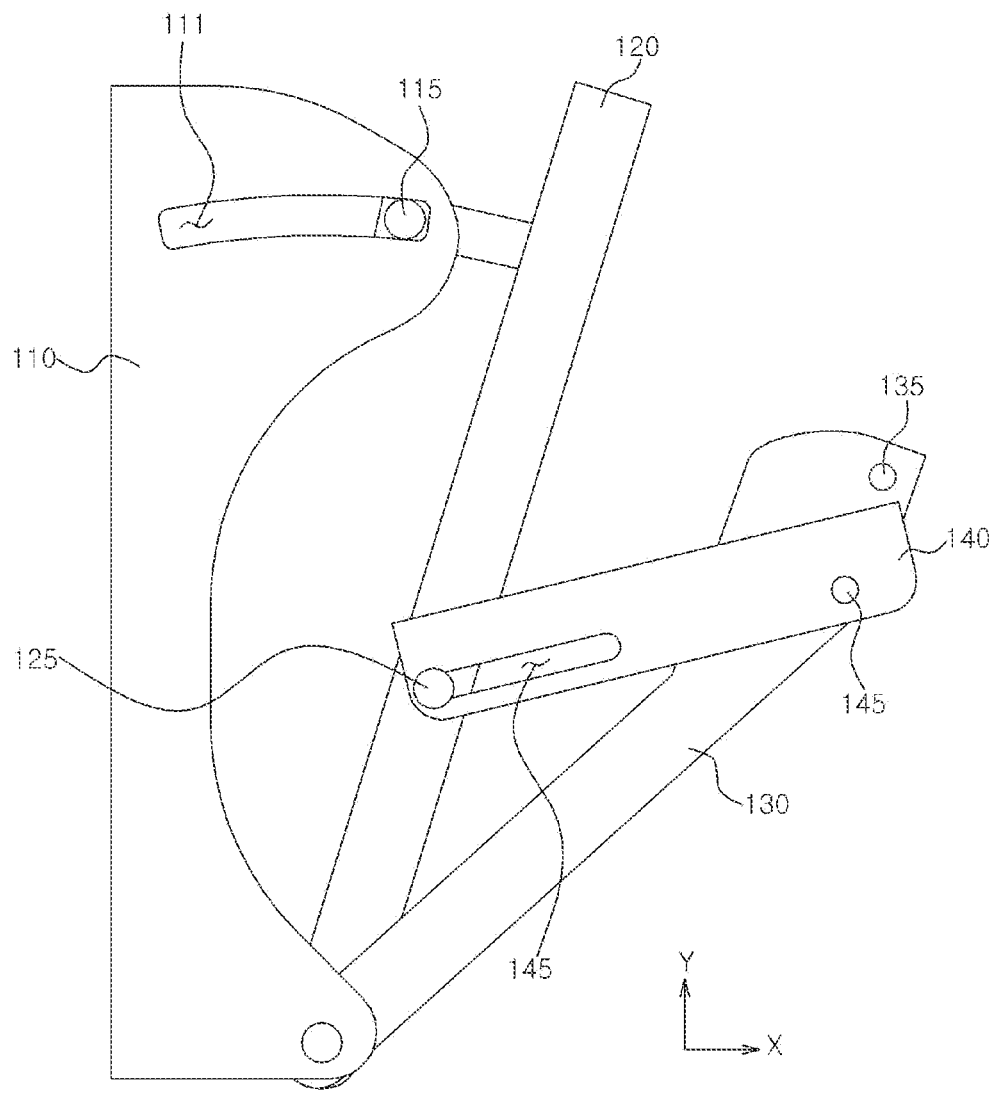
FIG. 7 is a side view illustrating a state that upon mounting a cassette, the cassette mounting unit is inclined.

FIG. 6 is a side view illustrating the mounting unit 10 in which the cassette 13 is not mounted thereon, and FIG. 7 is a side view illustrating a state that upon mounting the cassette 13, the mounting unit 10 is inclined. The state of the mounting unit 10 as shown in FIG. 6 may be the same as the state shown in FIG. 3, and the state of the mounting unit 10 shown in FIG. 7 may be the same as the state shown in FIG. 4. Hereinafter, an example of the structure in which the mounting unit 10 is inclined will be described with reference to FIGS. 6 and 7.

The pin member 135 may be fastened to a hook (not shown) which is provided in the second support member 130, which will be described later. The hook is penetrated by the shaft 112 (see FIG. 5) and may be rotated on the shaft 112. When the fastening of the pin member 134 and the hook is released, the second support member 130 may be inclined forward so as for the upper portion thereof to be away from the door 8 than the lower portion thereof. By inclining the second support member 130, the link member 140 also may be inclined forward so as for the upper portion thereof to be away from the door 8 than the lower portion thereof. In particular, as described above, the link member 140 may be coupled rotatably to the second support member 130, and thereby while the link member 140 is inclined forward, the coupling member 125 inserted into the second elongated hole 145 of the link member 140 may be moved from the central portion of the link member 140 toward one end (here, door 8 side end) of the link member 140. Thereby the angle between the first support member 120 and the second support member 130 may be increased, while the first support member is also inclined forward. Meanwhile, the first support member 120 may be allowed to be inclined due to the presence of the first elongated hole 111 and the guide shaft 115 of the second bracket 110.

After the cassette 13 is inserted between the first support member 120 and the second support member 130, when the cassette 13 or support members 120, 130 is pushed up by a user, the first support member 120 and the second support member 130 may access toward the door 8 along the first elongated hole 111 while maintaining the angle with respect to each other as the same as the angle shown in FIG. 7. Finally, when the upper end of the cassette 13 is connected to the second transfer unit 12, the rotation of the support members 120, 130 may be finished.

Meanwhile, when ending use of the cassette 13, the cassette 13 is removed and then the mounting unit 10 may be converted from the state of FIG. 7 to FIG. 6. Then, the pin member 135 may be fastened to the hook to maintain the state as FIG. 6. In order to explain this feature, FIG. 8 is presented.

Figure 8A:
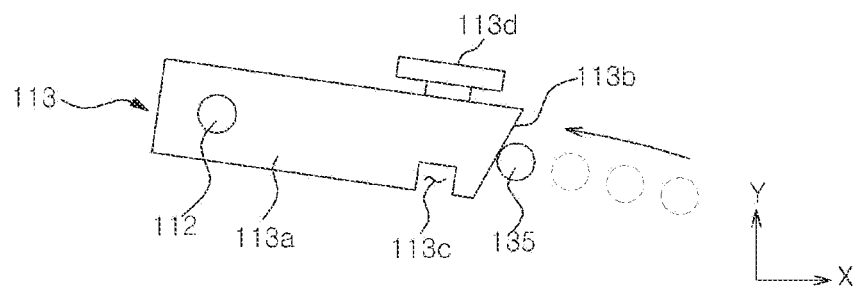
FIG. 8A to 8C are views illustrating a structure for a cassette mounting unit to maintain the state of FIG. 6.
Figure 8B:
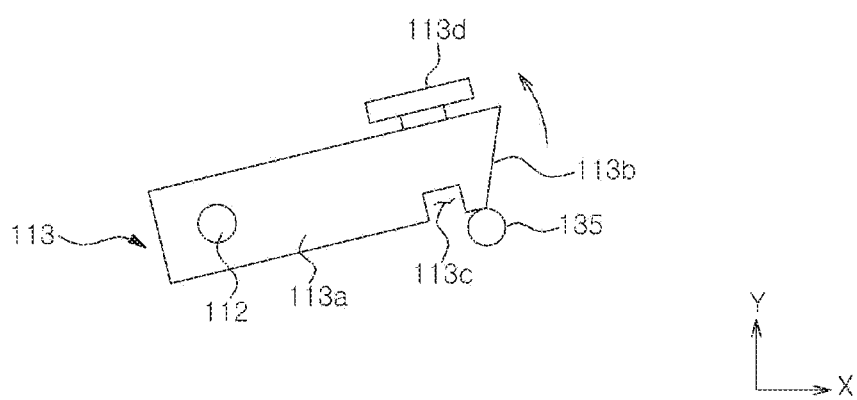
Figure 8C:
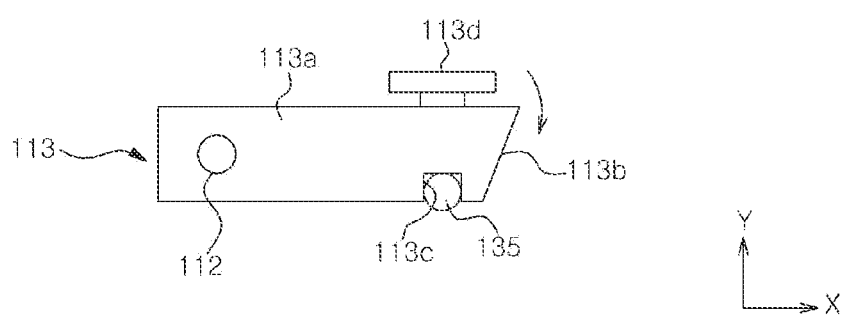

FIG. 8A to 8C are views illustrating a structure for the mounting unit 10 to maintain the state of FIG. 6. As shown, the end toward the door 8 of the hook 113 is penetrated by the shaft 112 as shown in FIG. 5 and may be rotated on the shaft 112. The hook 113 may include a main body 113a, a slope region 113b which is located at the opposite end of the door 8 and is formed so as to be away upwardly from the door 8, a coupling slot 113c which is formed in a concavity extending from the lower side to the upper side, and a handle 113d. Meanwhile, the pin member 135 may extend to the Z-direction.

FIG. 8A shows a state that when ending use of the cassette 13, the cassette 13 is removed and then the second support member 130 approaches toward the door 8. With the movement of the second support 130, the pin member 135 also may approach toward the door 8 and may be in contact with the slope region 113b of the hook 113. In this state, when the pin member 135 is continued to move, the hook 113 may rotate upwardly (in FIG. 8, rotating counterclockwise) on the shaft 112 by the movement of the pin member 135 on the slope region 113b, and as shown in FIG. 8B, the pin member 135 may start to enter the lower side of the hook 113. In the state as shown in FIG. 8C, when the pin member 135 is further continued to move toward the door 8, the pin member 135 may be inserted into the coupling slot 113c. At this time, the hook 113 which was lifted up may take an approximately horizontal position.

Figure 9:
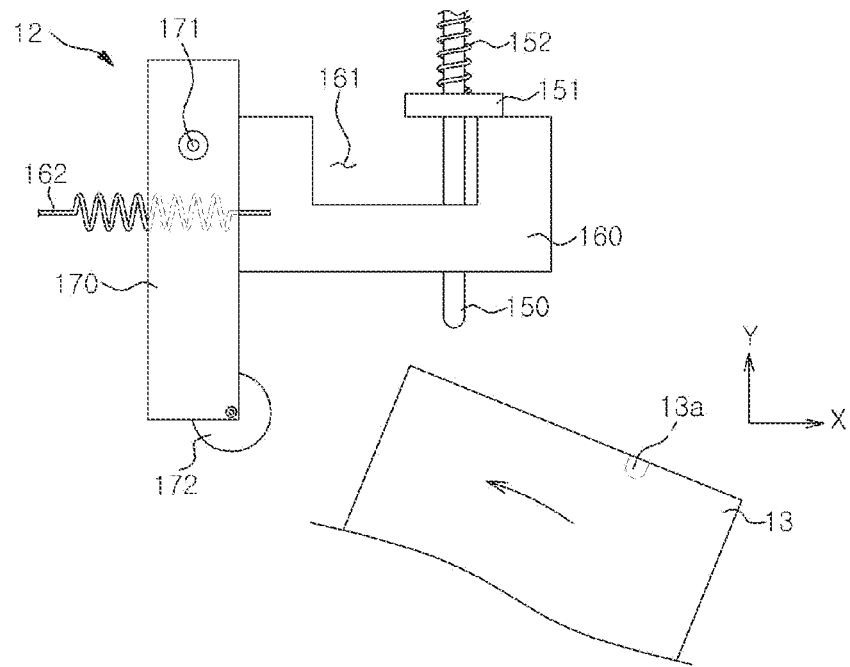
FIGS. 9 and 10 are views illustrating states that after a cassette is mounted, a position of the cassette is fixed.
Figure 10:
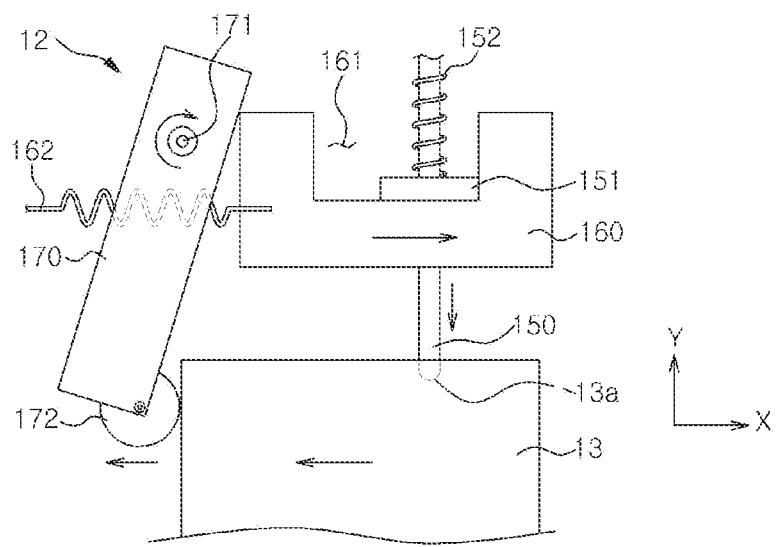

FIGS. 9 and 10 are views illustrating states that after the cassette 13 is mounted, a position of the cassette 13 is fixed. As described above, after the cassette 13 is mounted, the cassette 13 and the mounting unit 10 are released from inclining, and thereby the cassette 13 may be connected to the second transfer unit 12. Since the connection between the cassette 13 and the second transfer unit 12 must maintain for a predetermined operation, the teller cash recycler 1 according to the present embodiment may include a fixing unit. Hereinafter, with reference to FIGS. 9 and 10 a specific example of the fixing unit will be described.

The fixing unit may include a fixing pin 150, a holder 151, a first elastic member 152, a switch member 160, a second elastic member 162 and a rotary bar 170. The fixing unit may be provided in the second transfer unit 12.

The fixing pin 150 is elevated in the state that the cassette 13 is not mounted, but when the cassette 13 is mounted, the fixing pin 150 is lowed so as to be inserted into a fixing slot 13a, and thereby the position of the cassette 13 may be fixed. The fixing pin 150 may be extended in the vertical direction as shown in FIG. 9.

The holder 151 may be connected to the fixing pin 150 so as to move integrally with the fixing pin 150. For example, as in the present embodiment, the fixing pin 150 may be fastened to the holder 151 while penetrating the holder 151 above and below. The holder 151 may extend in the Z-direction. A user may grip a portion of the holder 151 to raise the holder 151 and then may raise the holder 151 and the fixing pin 150 at one try.

The first elastic member 152 may provide a downward elastic force to the holder 151 so as for the fixing pin 150 and the holder 151 to be lowered. In the present embodiment, it is illustrated that the first elastic member 152 is provided on the outer peripheral surface of the upper portion of the holder 151 of the portions of the fixing pin 150.

The switch member 160 may allow selectively the holder 151 and the fixing pin 150 to be lowered. For example, on the central portion of the switch member 160 a concavity 161 may be formed. In the state that the cassette 13 is not mounted, the holder 151 may be supported upwardly by a portion other than the concavity 161 of the switch member 160, that is, by a portion of which height is relatively higher. When the cassette 13 is mounted, the switch member 160 may be moved in one direction, and thereby the upward supporting force against the holder 151 may be removed, and the holder 151 and the fixing pin 150 may be lowered, until seating in the concavity 161. Meanwhile, the second elastic member 162 which provides an elastic force in the opposite direction of the direction of movement of the switch member 160 may be provided on the switch member 160. The second elastic member 162 may derive the switch member 160 to return to the original position.

The rotary bar 170 may be extended in the vertical direction, and may be coupled rotatably to one side of the teller cash recycler 1 at the coupling point 171. The lower portion of the rotary bar 170 may be pushed toward the door 8 by the cassette 13, thereby being capable of rotating on the coupling point 171. Subsequently, the upper portion of the rotary bar 170 may be moved toward the opposite direction of the door 8 by the above mentioned rotation. Meanwhile, the lower portion of the rotary bar 170 may be equipped with a roller 172 to protect the surface of the cassette 13, and may follow the rotation of the cassette 13 at maximum in order to rotate at maximum.

For the explanation of the operational relationship of the fixing unit 10 with reference to FIG. 10, as the cassette 13 approaches toward the door 8, one side of the cassette 13 may be in direct contact to the roller at the bottom of the rotary bar 170. With this, the rotary bar 170 may be rotated on the coupling point 171 and the teller cash recycler 1 (the clockwise direction in FIG. 10), and the upper portion of the rotary bar 170 may move the switch member 160 toward the opposite side of the door 8. By the movement of the switch member 160, the holder 151 is no longer supported upwardly by the upper portion of the switch member 160, and the holder 151 and the fixing pin 150 may be lowered by the downward elastic force of the first elastic member 152 until seating in the concavity 161. At this moment, a portion of the lower part of the fixing pin 150 may be inserted into the fixing slot 13a formed in the cassette 13.

When ending use of the cassette 13, a user may raise the holder 151 with a bigger force than the elastic force provided by the first elastic member 152, and thereby the fixing pin 150 may be raised as well and thus may be separated from the fixing slot 13a. As a result that the interference action by the holder 151 is eliminated, the switch member 160 may be moved again toward the door 8 by the elastic force in the direction toward the door 8 provided by the second elastic member 162, and thereby the rotary bar 170 also may be rotated in a counterclockwise direction relative to FIG. 10. Subsequently, the bottom of the rotary bar 170 may push the cassette 13 toward the opposite direction of the door 8, and thereby the cassette 13 and the mounting unit 10 may be inclined forward again. In the state that the cassette 13 and the mounting unit 10 are inclined forward, the cassette 13 may be removed. Meanwhile, in order for a user to raise the holder 151 as mentioned in the above, the width of the holder 151 may be larger than the width of the switch member 160. In other words, as the holder 151 may be extended more in the Z direction than the switch member 160, a portion of the holder 151 may not be supported upwardly by the switch member 160. A user can lift up simply the portion of the holder 151 which is exposed to the outside.

FIG. 11 is a view illustrating a state as viewed from the front of the cassette 13 when the cassette 13 is mounted. The present embodiment may include a home position module 170 deriving the cassette 13 to be at home position. Hereinafter, the home position module 170 will be described with reference to FIG. 11.

As described above, after mounting the cassette 13, the cassette 13 and the mounting unit 10 are released from inclining, and thereby the cassette 13 may be connected to the second transfer unit 12. At this moment, in the structure 150 of the cassette 13 and the second transfer unit 12, it is necessary to match the corresponding structures 13a, 151 in order to ensure various operations related to the cassette 13 to be carried out smoothly and to prevent a phenomenon of jamming.

As shown in FIG. 11, the home position module 200 may be installed on the frame 190 of the teller cash recycler 1 adjacent to the second transfer unit 12. Home position module 200 is provided in a plurality on both sides to support the side of the cassette 13, and thereby the cassette 13 may be centering.

For example, the home position module 200 may include a bar which is extended in the vertical direction, a roller 202 which is connected to one end of the bar 201 as a rotating axis and is in contact with the cassette 13, an elastic member 203 which is provided on the outer peripheral surface of the bar 201, and the case 204. As a reference of the home position module 200 positioned in the left of FIG. 11, the roller 202 rotating by contacting to the side of the case 13 may derive the case 13 to be mounted while moving toward the right. In particular, in order to prevent a damage of the bar 201 and to ensure a smooth centering of the case 13, the elastic member 203 may be configured of a conical spring to provide a lateral elastic force to the cassette 13.

The embodiments as set forth above are merely described for some examples of technical idea of the present invention. Technical idea of the present invention is not limited to the embodiments as set forth above, and it will be understood by those skilled in the art to which this invention belongs that various changes, modifications and substitutions may be made without departing from technical idea of the present invention, and all of such implementations should be within the scope of the technical idea of the present invention.

What is claimed is:

1. A teller cash recycler, comprising:
   a handling unit including a deposit section in which banknotes are deposited and a withdrawal section in which banknotes are withdrawn;
   a safe having at least one storage unit in the inside thereof where banknotes are stored;
   a door for selectively opening and closing the safe;
   a first transfer unit for transferring banknotes between the handling unit and the storage unit;
   a cassette mounting unit provided separate from the door; and
   a second transfer unit for transferring banknotes between a cassette mounted on the cassette mounting unit and the handling unit, or the cassette mounted on the cassette mounting unit and the first transfer unit,
   wherein the cassette mounting unit comprises:
   a first support member for supporting a part of a door side of the cassette;
   a second support member for supporting the opposite part of the door side of the cassette; and
   a link member which is connected rotatably to the first support member and the second support member respectively and controls an angle between the first support member and the second support member by the rotation, and
   wherein the cassette is inserted between the first support member and the second support member so that the cassette comes into direct contact with the first support member and the second support member.

2. The teller cash recycler of claim 1, wherein when the cassette is mounted, the cassette mounting unit is inclined so as for the upper portion thereof to be away from the door than the lower portion thereof, and the cassette is inserted into the cassette mounting unit at an angle.

3. The teller cash recycler of claim 2, wherein after the cassette is mounted on the cassette mounting unit, when an external force is applied toward the door for the cassette or the cassette mounting unit, the cassette and the cassette mounting unit are released from inclining and the cassette is connected to the second transfer unit.

4. The teller cash recycler of claim 2, wherein the handling unit is provided on the upper portion of the teller cash recycler, and
   wherein when the cassette is inserted into the cassette mounting unit in the inclined state, the upper end of the cassette is positioned below the lower end of the handling unit.

5. The teller cash recycler of claim 1, wherein the cassette mounting unit further comprising:
   a bracket being connected to the door and having a first elongated hole formed in the upper portion thereof; and
   a guide shaft being connected to the first support member and being moved along the first elongated hole at both ends thereof, and
   wherein the first support member is rotatable on the lower portion thereof by the movement of the guide shaft.

6. The teller cash recycler of claim 5, wherein the first elongated hole includes a part of downward curvature in a direction away from the door side.

7. The teller cash recycler of claim 1, wherein the cassette mounting unit further includes a bracket being connected to the door and having a first elongated hole formed in the upper portion thereof, and
   wherein the lower portion of the second support member is connected rotatably to the lower portion of the bracket so as for the second support member to be capable of rotating on the lower portion of the bracket.

8. The teller cash recycler of claim 1, wherein on one side of the link member, a second elongated hole extending from one end to the central portion of the link member is formed, and the other side of the link member is connected rotatably to the second support member, and
   wherein the cassette mounting unit further includes a coupling member which is inserted into the second elongated hole while still connected to the first support member and is moved along the second elongated hole, and wherein based on the case where the cassette mounting unit is inclined so as for the cassette to be mounted thereon, the first support member and the second support member are inclined so as for the respective upper portion to be away from the door than the respective lower portion, and by the movement of the coupling member toward the direction away from the central portion of the link member along the second elongated hole, the link member is rotated so as for the angle between the first support member and the second support member to be increased.

9. The teller cash recycler of claim 1, wherein the cassette mounting unit further includes a support shaft which supports the lower portion of the cassette.

10. The teller cash recycler of claim 1, wherein the cassette mounting unit further includes:
   a bracket connected to the door;
   a hook provided in the bracket; and
   a pin member provided in the second support member, wherein when the cassette is not mounted, as the second support member approaches to the door side, the pin member being fastened to the hook.

11. The teller cash recycler of claim 10, wherein the cassette mounting unit further includes a shaft of which both ends are connected to the bracket respectively,
   wherein the hook includes a sloped region, which is located at the end opposite of the door and becomes away from the door toward the upper direction, and a coupling slot which is formed in a concavity from the bottom to the top, the hook being penetrated by the shaft at the end of the door side so as to be rotatable, and
   wherein the pin member is inserted into the coupling slot, after the hook is rotated upwardly, as the pin member approaches to the door side while still being contact with the sloped region.

12. The teller cash recycler of claim 11, wherein a handle which can be gripped by a user for rotating upwardly the hook is provided on one side of the hook.

13. The teller cash recycler of claim 1, further comprising a fixing unit for fixing a position of the cassette when the cassette is connected to the second transfer unit.

14. The teller cash recycler of claim 13, wherein the fixing unit includes:
   a fixing pin being capable of inserting into a fixing slot which is formed by extending in the vertical direction;
   a holder being moved integrally with the fixing pin;
   a first elastic member providing a downward elastic force to the holder; and
   a switch member allowing selectively the holder and the fixing pin to be lowered.

15. The teller cash recycler of claim 14, wherein the fixing unit further include a rotary bar which is rotatable by the contact of the lower portion thereof with the cassette,
   wherein the switch member has a concavity formed in the central portion thereof, and
   wherein when the rotary bar is rotated, the upper portion of the rotary bar moves the switch member to the opposite side of the door, the holder and the fixing pin are lowered on the concavity by the downward elastic force, and the fixing pin is inserted into the fixing slot of the cassette.

16. The teller cash recycler of claim 15, wherein the width of the holder is formed larger than the width of the switch member so as for at least one end of the holder is not supported upwardly by the switch member.

17. The teller cash recycler of claim 15, wherein the fixing unit further include a second elastic member which provides an elastic force to the switch member in the direction toward the door, and
   wherein when the holder and the fixing pin are raised, the switch member is returned to the original position by the elastic force exerted in the direction toward the door.

18. The teller cash recycler of claim 15, wherein the rotary bar is provided with a roller being in direct contact to the cassette in the lower portion thereof.

19. The teller cash recycler of claim 1, further comprising a home position module guiding the cassette to a home position when the cassette is connected to the second transfer unit.

20. A teller cash recycler, comprising:
   a handling unit including a deposit section in which banknotes are deposited and a withdrawal section in which banknotes are withdrawn;
   a safe having at least one storage unit in the inside thereof where banknotes are stored;
   a door for selectively opening and closing the safe;
   at least one transfer unit for transferring banknotes;
   a cassette mounting unit provided separate from the door; and
   a cassette being selectively mounted on the cassette mounting unit,
   wherein when the cassette is mounted, at least a portion of the cassette mounting unit moves in a direction away from the door such that a space is formed between the at least a portion of the cassette mounting unit and the door, and the cassette is inserted into the space and,
   wherein the cassette mounting unit comprises:
   a first support member for supporting a part of a door side of the cassette;
   a second support member for supporting the opposite part of the door side of the cassette; and
   a link member which is connected rotatably to the first support member and the second support member respectively and controls an angle between the first support member and the second support member by the rotation, and
   wherein the cassette is inserted between the first support member and the second support member so that the cassette comes into direct contact with the first support member and the second support member.

* * * * *